US011790694B1

(12) United States Patent
Raman

(10) Patent No.: US 11,790,694 B1
(45) Date of Patent: Oct. 17, 2023

(54) VIDEO PLAYER FOR SECURED VIDEO STREAM

(71) Applicant: Bank of America Corporation, Charlotte, NC (US)

(72) Inventor: Sundarrajan Raman, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 313 days.

(21) Appl. No.: 17/177,880

(22) Filed: Feb. 17, 2021

(51) Int. Cl.
*G06V 40/16* (2022.01)
*H04L 9/30* (2006.01)
*G06V 20/40* (2022.01)

(52) U.S. Cl.
CPC ............ *G06V 40/173* (2022.01); *G06V 20/41* (2022.01); *G06V 20/46* (2022.01); *G06V 40/161* (2022.01); *H04L 9/30* (2013.01)

(58) Field of Classification Search
CPC ...... G06V 40/173; G06V 20/41; G06V 20/46; G06V 40/161; H04L 9/30
See application file for complete search history.

(56) References Cited

U.S. PATENT DOCUMENTS

| | | | |
|---|---|---|---|
| 5,842,191 | A | 11/1998 | Stearns |
| 9,659,185 | B2 | 5/2017 | Elovici et al. |
| 10,262,236 | B2 | 4/2019 | Lim et al. |
| 11,514,714 | B1 * | 11/2022 | Soltani .................. G06V 40/168 |
| 2004/0131254 | A1 | 7/2004 | Liang et al. |
| 2007/0011711 | A1 | 1/2007 | Wolf et al. |
| 2011/0317009 | A1 | 12/2011 | Kumaraswamy et al. |
| 2014/0250457 | A1 | 9/2014 | Ramaswamy |
| 2015/0256835 | A1 | 9/2015 | Sakai |
| 2016/0004914 | A1 | 1/2016 | Park |
| 2016/0019426 | A1 | 1/2016 | Tusch et al. |
| 2017/0185829 | A1 | 6/2017 | Walsh et al. |
| 2017/0223310 | A1 | 8/2017 | Farrell et al. |
| 2017/0311863 | A1 | 11/2017 | Matsunaga |
| 2018/0114017 | A1 | 4/2018 | Leitner et al. |
| 2018/0189505 | A1 * | 7/2018 | Ghafourifar ........ G06F 21/6209 |
| 2018/0225518 | A1 | 8/2018 | Gu et al. |
| 2018/0268222 | A1 | 9/2018 | Sohn et al. |

(Continued)

OTHER PUBLICATIONS

Raman, S., "Media Hosting System Employing a Secured Video Stream," U.S. Appl. No. 17/177,736, filed Feb. 17, 2021, 39 pages.

*Primary Examiner* — Helen Zong

(57) ABSTRACT

A secure media hosting system stores a protected portion of an audio-video (AV) recording, a private key associated with the AV recording, and a mask identifier. A media player device is communicatively coupled to the secure media hosting system. The media player device receives a media stream that includes a first portion of an AV recording, a public key corresponding to the AV recording, and the mask identifier. The public key and mask identifier are extracted from the media stream. A request for the protected portion of the AV recording is provided. The request includes the extracted public key and mask identifier. After providing the request for the protected portion of the AV recording, the protected portion of the AV recording is received. The first portion and protected portion of the AV recording are combined. The combined first and protected portions of the AV recording are displayed.

20 Claims, 5 Drawing Sheets

(56) References Cited

U.S. PATENT DOCUMENTS

| | | |
|---|---|---|
| 2018/0316890 A1 | 11/2018 | Farrell et al. |
| 2018/0341878 A1 | 11/2018 | Azout et al. |
| 2019/0029528 A1 | 1/2019 | Tzvieli et al. |
| 2019/0046044 A1 | 2/2019 | Tzvieli et al. |
| 2019/0052839 A1 | 2/2019 | Farrell et al. |
| 2019/0073523 A1 | 3/2019 | Lee et al. |
| 2019/0122072 A1 | 4/2019 | Cricri et al. |
| 2019/0147333 A1 | 5/2019 | Kallur Palli Kumar et al. |
| 2019/0164173 A1 | 5/2019 | Liu et al. |
| 2019/0179861 A1 | 6/2019 | Goldenstein et al. |
| 2019/0213720 A1 | 7/2019 | Urashita |
| 2019/0213721 A1 | 7/2019 | Urashita |
| 2019/0236614 A1 | 8/2019 | Burgin et al. |
| 2019/0258870 A1 | 8/2019 | Kundu et al. |
| 2019/0278378 A1 | 9/2019 | Yan et al. |
| 2019/0290127 A1 | 9/2019 | Hanina et al. |
| 2019/0290129 A1 | 9/2019 | Hanina et al. |
| 2019/0303655 A1 | 10/2019 | Werner et al. |
| 2019/0313915 A1 | 10/2019 | Tzvieli et al. |
| 2019/0349613 A1 | 11/2019 | Pikes et al. |
| 2019/0355128 A1 | 11/2019 | Grauman et al. |
| 2020/0074183 A1 | 3/2020 | Altuev |
| 2020/0092301 A1 | 3/2020 | Coffing |
| 2021/0329005 A1* | 10/2021 | Locke ................ H04L 63/1475 |
| 2022/0201312 A1* | 6/2022 | Yuan .................... H04L 9/3236 |

* cited by examiner

VIDEO PLAYER FOR SECURED VIDEO STREAM

TECHNICAL FIELD

The present disclosure relates generally to synthetic media. More particularly, in certain embodiments, the present disclosure is related to a video player for secured video stream.

BACKGROUND

Synthetic media, such as so called "deepfake" videos, can be generated to mislead media consumers. For instance, a video of an individual speaking can be edited or generated to make it appear as though a person has spoken words that her/she did not actually speak and/or performed actions he/she did not actually perform.

SUMMARY

Synthetic media is becoming increasingly realistic and difficult to recognize. Humans are generally unable to reliably identify images and videos that contain synthetic media. Previous technology is generally incapable of reliably and efficiently detecting synthetic media or preventing the creation of synthetic media. Synthetic media may be created by software that uses artificial intelligence that is trained using existing videos of a subject to create synthetic videos of the subject moving about and/or speaking. This disclosure uniquely recognizes that the creation of synthetic media may be mitigated by preventing bad actors who wish to create synthetic media from accessing the existing videos of subjects that are needed to create realistic synthetic media of the subjects. For example, this disclosure recognizes that if bad actors can be prevented from accessing videos of a given subject (e.g., a high profile individual), then the bad actors will be unable to create synthetic media of that subject.

Certain embodiments of this disclosure provide unique solutions to technical problems of previous technology, including those described above, by effectively protecting videos from being used for the creation of synthetic media. For example, the disclosed systems provide several technical advantages which may include: 1) automatically identifying and extracting face portions of videos which may be used to create synthetic media of subject(s) appearing in the videos; 2) storing the extracted portions in a protected form such that the protected portions are linked to regions of the original video source; and 3) dynamically combining protected video portions with video from a media stream to display a securely reconstructed video of the subject. As such, this disclosure may improve the function of computer systems used to present, store, and/or display media. For example, the systems described in this disclosure may prevent the creation of synthetic media of subjects appearing in videos and/or facilitate the reliable and efficient presentation of media that is stored in a manner to prevent synthetic media creation.

In some embodiments, the systems, methods, and devices described in this disclosure may particularly be integrated into the practical application of a media storage and hosting system. The media storage and hosting system extracts faces of subjects from videos, stores the face portions with a private key, and stores the remaining portion of the video with a public key, such that a public media stream can be hosted with the face portions removed and the protected portion is only available to media players holding the proper access rights and the correct public key. In some embodiments, the systems, methods, and devices described in this disclosure may particularly be integrated into the practical application of a media player with a dynamic video reconstruction capability. The media player recognizes that portions of a video in a media stream are missing, automatically obtains protected portions corresponding to the missing portions, and overlays the protected portions on the video from the media stream.

Certain embodiments of this disclosure may include some, all, or none of these advantages. These advantages and other features will be more clearly understood from the following detailed description taken in conjunction with the accompanying drawings and claims.

In an embodiment, a media hosting system receives an audio-video recording that includes a plurality of image frames. For each image frame of the audio-video recording, an image region is determined that corresponds to a first face of a first subject presented in the image frame. A first face portion of the audio-video recording is stored that corresponds to the determined image region for each of the image frames along with a private key for the audio-video recording and a first mask identifier for the first subject. A public key is generated that corresponds to the private key stored with the first face portion of the audio-video recording. A remaining portion of the audio-video recording is associated with the generated public key and the first mask identifier for the first subject. The remaining portion of the audio-video recording includes each image frame of the audio-video recording with the first face portion removed. The remaining portion of the audio-video recording, the associated public key, and the associated first mask identifier are provided to a media server that communicates with a media player. The media player displays a presentation of the remaining portion of the audio-video recording with an overlay of the first face portion of the audio-video recording.

In another embodiment, a system includes a media server configured to provide a media stream that includes a first portion of an audio-video recording, a public key corresponding to the audio-video recording, and a mask identifier associated with a subject presented in the audio-video recording. A secure media hosting system stores a protected portion of the audio-video recording, a private key associated with the audio-video recording, and the mask identifier. A media player device is communicatively coupled to the media server and the secure media hosting system. The media player device receives the media stream. The public key and mask identifier are extracted from the media stream. A request for the protected portion of the audio-video recording is provided. The request includes the extracted public key and mask identifier. After providing the request for the protected portion of the audio-video recording, the protected portion of the audio-video recording is received. The first portion and protected portion of the audio-video recording are combined. The combined first portion and protected portion of the audio-video recording are displayed.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, prior to this disclosure, there was a lack of tools for preventing the proliferation of synthetic media. The system described in this disclosure solves the technical problems of previous technology by extracting and securely storing portions of videos that are associated with the faces of subjects. Only approved media players can obtain the protected face portions of the videos, and the complete video is dynamically reconstructed such that the complete video cannot be downloaded/accessed in a form usable for synthetic media creation. Accordingly, bad actors wishing to create synthetic media will not have the appropriate content (i.e., the face portions of videos) for creating synthetic media. The system also facilitates the presentation of reconstructed videos via the dynamic overlay of the protected video portion(s) with the remaining video portions provided in a media stream.

As used in this disclosure, media generally refers to video, images, or audio content. However, media encompasses any other appropriate media which may be shared and/or distributed in a digital format. An example of media for a subject is a video of the subject speaking. As used in this disclosure, "real media" refers to media that depicts (e.g., is a recording or other representation of) the subject without any adulteration to the information provided in the media. For example, a "real" video of a subject may be an audio-visual recording of the subject speaking. As used in this disclosure, "synthetic media" refers to media which has been edited to attribute actions and/or words to a subject that were not performed/spoken by the subject. For example, a "synthetic" video may include an edited version of a "real" video of the subject speaking which has been created or edited to show the subject speaking words that were not actually spoken by the subject in the real video.

System for Secure Video Storage, Hosting, and Display

Figure 1:
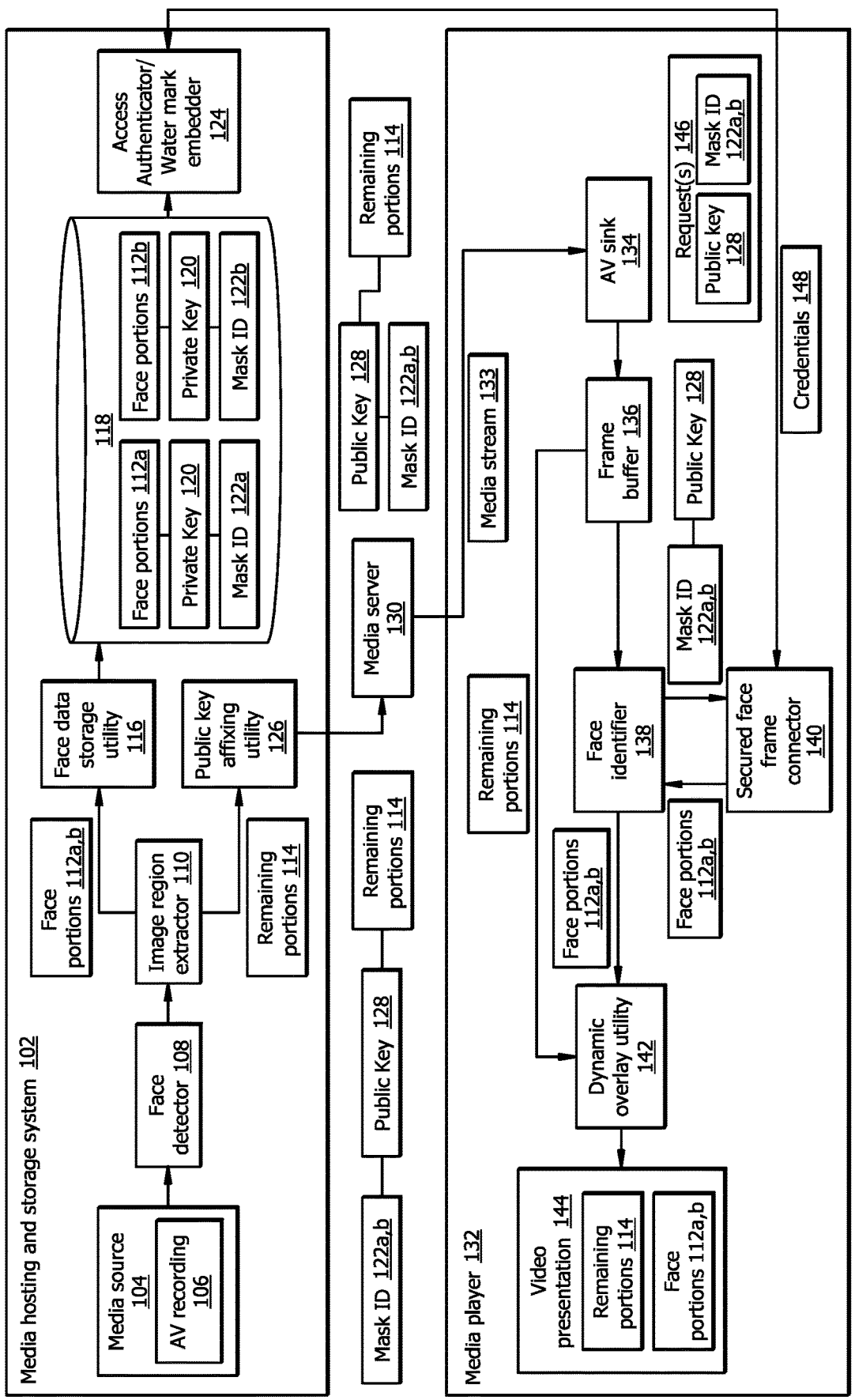
FIG. 1 is a schematic diagram of a media hosting and presentation system.

FIG. 1 is a schematic diagram of an example system 100 for securely storing, hosting, and displaying media. The system 100 includes a media hosting and storage system 102, a media server 130, and a media player device 132. The media hosting and 30 storage system 102 is generally configured to separate a received audio-visual (AV) recording 106 into one or more protected face portions 112*a,b* and a remaining portion 114, securely store the protected face portions 112*a,b,* and only provide the protected face portions 112*a,b* to an appropriately authenticated media player device 132, as described in greater detail below. Since the protected face portion(s) 112*a,b* of the AV recording 106 generally include faces of subjects presented in the AV recording 106 and the remaining portions 114 of the AV recording 106 do not include faces, synthetic media cannot be created using the remaining portions 114 alone. As such, the media hosting and storage system 102 helps prevent bad actors from obtaining the full or entire AV recording 106 (e.g., via download from the media server 106) in a form that would be usable for synthetic media creation.

Media Hosting and Storage System

Figure 2:
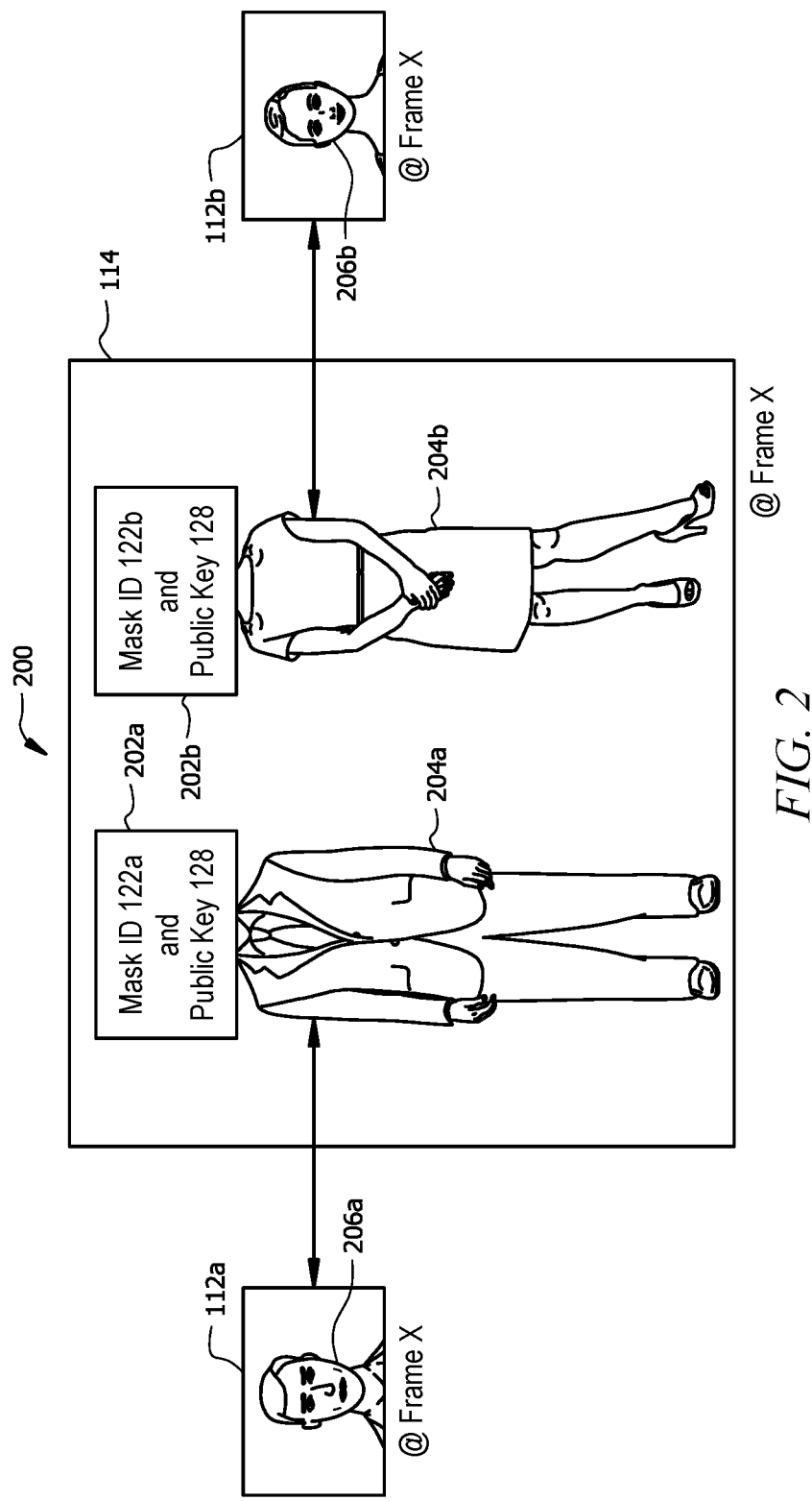
FIG. 2 is a diagram illustrating the dynamic overlay of protected face portions on the remaining portions of a frame of an audio-video recording using the system of FIG. 1.

The example media hosting and storage system 102 of FIG. 1 includes a media source 104, a face detector 108, an image region extractor 110, a face data storage utility 116, a secure database 118, an access/authenticator/watermark embedder 124, and a public key affixing utility 126. The media hosting and storage system 102 and its various components 104, 108, 110, 116, 118, 124, 126 may be implemented using the processor, memory, and interface of the device 500 described with respect to FIG. 5 below. The media source 104 generally includes any source(s) of an AV recording 106, such as a server, data store, or database. For instance, the AV recording 106 may be provided or retrieved over a network from a server media source 104 configured to host the AV recording 106. As an example, the AV recording 106 may be an audio-visual recording or video of one or more individuals speaking. The AV recording includes a plurality of frames of images and may include audio. FIG. 2 shows an example frame 200 of an AV recording 106 with a presentation of a first person 204*a* and second person 204*b*. The example frame 200 of FIG. 2 is described in greater detail in the context of the function of various components of the system 100 below.

Returning to FIG. 1, the face detector 108 is generally configured to detect faces of subjects (i.e., people) presented in the AV recording 106. The face detector 108 may use any method of face detection, including one or more methods of machine learning for detecting faces in image frames of the AV recording 106. In addition to detecting faces in the AV recording 106, the face detector 108 may determine an identity of a person associated with the face. In some cases, faces of certain individuals (e.g., persons of interest, such as celebrities or other high profile individuals in an organization associated with the media hosting and storage system 102) are protected using the media hosting and storage system 102. For example, the face detector 108 may detect the face of a person of interest, such that synthetic media creation for this person of interest is mitigated by the media hosting and storage system 102. For example, the face detector 108 may execute instructions (e.g., the face detection instructions 508 of FIG. 5) which include a record of faces of interest (e.g., record 514 of FIG. 5) corresponding to subjects for whom the creation of synthetic media should be prevented.

The image region extractor 110 generally uses faces detected by the face detector 108 (e.g., faces of persons of interest) to extract regions corresponding to faces of known subjects for whom the media hosting and storage system 102 protects against the creation of synthetic media. For example, as illustrated for the example frame 200 of FIG. 2, face portions 112*a,b* are removed from corresponding regions 202*a,b,* leaving the remaining portions 114 of the frame 200. For instance, first face portions 112*a* may be extracted for region 202*a* of the AV recording 106 corresponding to the face 206*a* of a first known subject 204*a* presented in the AV recording 106, and second face portions 112*b* may be extracted for different region 202*b* corresponding to the face 206*b* of a second known subject 204*b* presented in the AV recording 106. Returning to FIG. 1, the face portions 112*a,b* are provided to the face storage utility 116 for secure storage in the secure database 118, while the remaining portions 114 (i.e., the portions of the AV recording 106 that are not face portions 112a,b) are provided to the public key affixing utility 126.

The face data storage utility 116 is configured to store the face portion(s) 112a,b of the AV recording 106 from the region (e.g., region 202a,b of FIG. 2) determined by the image region extractor 110. The face data storage utility is in communication with the secure database 118 and the public key affixing utility 126. The face portion(s) 112a,b may be stored in an encrypted form. The face data storage utility 116 determines a private key 120 and public key 128 combination for decrypting the securely stored face portion(s) 112a,b. The public key 128 is provided to the public key affixing utility 126. Any cryptographic approach or algorithm may be used to generate the private key 120 and public key 128. The face data storage utility 116 also generates a mask identifier 122a,b for each face detected in the AV recording 106 for which a corresponding face portion 112a,b is stored. For example, if faces of two subjects are detected in the AV recording 106 as in the example of FIG. 2 with subjects 204a,b, the face data storage utility 116 may store first face portions 112a along with a linked first mask identifier 122a and second face portions 112b along with a linked second mask identifier 122b in the secure database 118.

The secure database 118 is generally any database or datastore operable to securely store (e.g., in an encrypted form) the face portions 112a,b, private key 120, and mask identifiers 122a,b. The secure database 118 may be associated with an access authenticator/watermark embedder 124. The access authenticator/watermark embedder 124 is generally operable to control access to information stored by the media hosting and storage system 102. For example, the access authenticator/watermark embedder 124 may authenticate access to the secure database 118 to retrieve face portions 112a,b from the secure database 118. The access authenticator/watermark embedder 124 may also or alternatively embed a watermark in the face portions 112a,b that are provided from the database 118. The watermark may aid in preventing use of the face portions 112a,b for creating synthetic media and/or labeling the face portions 112a,b that are provided to the media player device 132.

The public key affixing utility 126 receives the remaining portions 114 of the AV recording 106 from the image region extractor 110. As described above and illustrated in FIG. 2, the remaining portions 114 includes frames 200 the AV recording 106 with the face portions 112a,b removed. The public key affixing utility 126 links the remaining portions 114 to the public key 128 that can be used along with the private key 120 to decrypt the face portions 112a,b and the mask identifiers 122a,b, which identify the face portions 112a,b that have been removed from the AV recording 106 to obtain the remaining portions 114. Referring also to the example of FIG. 2, the public key affixing utility 126 may encode regions 202a,b of the remaining portions 114 that are missing faces 206a,b with the mask identifier 122a,b for the person 204a,b whose face 206a,b was removed and the public key 128 needed to decrypt the face portions 112a,b. The remaining portions 114, public key 128, and mask identifiers 122a,b may be provided to the media server 130, such that the remaining portions 114 can be retrieved for viewing by a media player, such as the media player device 132 of FIG. 1. Media players without authenticated access to the media hosting and storage system 102 and/or that are not configured to extract and use mask identifiers 122a,b and public key 128 to obtain face portions 112a,b can only view the remaining portions 114 of the AV recording 106, such that the face portions 112a,b are not available to train an algorithm for the creation of synthetic media. Only appropriately authenticated and configured media players, such as the example media player 132 described in greater detail below, can access and appropriately use the face portions 112a,b to recreate a video presentation 144 that includes all elements of the original AV recording 106.

The media server 130 is generally any device or collection of devices (e.g., configured as a server or virtual server) operable to receive the remaining portions 114 of the AV recording 106 and the public key 128 and mask identifiers 122a,b. The media server 130 is communication with the media hosting and storage system 102 and one or more media players, including the example media player 132, described below. The media server 130 is operable to provide a media stream 133 that includes the remaining portions 114, public key 128, and mask identifiers 122a,b to one or more media players, including the example media player 132.

Media Player Device

The media player device 132 is generally any device operable to receive the remaining portions 114 of the AV recording 106 from the media server 130, obtain the face portions 112a,b of the AV recording 106, and use these portions 112a,b, 114 to display a video representation 144 of the AV recording 106. The media player device 132 includes an audio-video (AV) sink 134, a frame buffer 136, a face identifier 138, a secured face frame connector 140, and a dynamic overlay utility 142. The media player 132 and its various components 134, 136, 138, 140, 142 may be implemented using the processor, memory, and interface of the device 500 described with respect to FIG. 5 below.

The AV sink 134 uses memory of the media player device 132 (e.g., the memory 504 of the device 500 of FIG. 5) to store the remaining portions 114 of the AV recording 106, the public key 128, and the mask identifiers 122a,b as they are received. The AV sink 134 provides the remaining portions 114, public key 128, and mask identifiers 122a,b to the frame buffer 136. The frame buffer 136 extracts the mask identifiers 122a,b and the public key 128 and provides these to the face identifier 138. The frame buffer 136 provides the remaining portions 114 to the dynamic overlay utility 142 for generating the video presentation 144, as described below. The frame buffer 136 may temporarily store (e.g., in a memory of the media player device 132—see memory 504 of FIG. 5) until the protected face portions 112a,b are obtained as described further below. Once the video presentation 144 is presented the remaining portions 114 may be removed from memory.

The face identifier 138 provides the extracted mask identifiers 122a,b and public key 128 to the secured face frame connector 140. The secured face frame connector 140 is in communication with the media hosting and storage system 102. The secured face frame connector 140 may provide a request 146 for the protected face portions 112a,b along with any necessary authentication credentials 148 for accessing information stored in the secure database 118 of the media hosting and storage system 102. The secured face frame connector 140 may provide the mask identifier 122a,b and public key 128 to the media hosting and storage system 102. The media hosting and storage system 102 receives the request 146 and identifies the face portions 112a,b corresponding to the received mask identifiers 122a,b. If the public key 128 is the appropriate key for decrypting the stored face portions 112a,b in combination with the private key 120, the media hosting and storage system 102 may decrypt the face portions 112a,b and provide the decrypted face portions 112a,b to the secured face frame connector 140 of the media player device 132. While in the example of FIG. 1 the media player device 132 receives the face portions 112a,b from the media hosting and storage system 102 described above, the media player device 132 can generally receive secured face portions 112a,b from any source of secured face portions 112a,b of the AV recording 106 (e.g., that may be configured differently than the media hosting and storage system 102).

After receiving the face portions 112a,b, the secured face frame connector 140 provides the face portions 112ab to the face identifier 138. The face identifier 138 may use the mask identifiers 122a,b to determine regions of the remaining portions 114 of the AV recording 114 in which the face portions 112a,b should be inserted (e.g., regions 202 of FIG. 2). Referring to the example frame 200 of FIG. 2, in each frame 200 of the remaining portions 114 of the AV recording 106, the face identifier 138 may identify a first region 202a of the remaining portions 114 in which first face portions 112a should be inserted and a second region 202b in which second face portions 112b should be inserted. The encoded mask identifiers 122a,b and/or public keys 128 in the regions 202a,b may be used to determine which face portion 112a,b should be inserted into each region 202a,b. For example, the face portion 112a,b that is associated with a given mask identifier 122a,b may be overlayed (see dynamic overlay utility 142 described below) on the region 202a,b encoded with the same mask identifier 122a,b. Returning to FIG. 1, this information (e.g., where to overlay each face portion 112a,b in available regions 202a,b of the remaining portions 114 of the AV recording 106) is provided along with the face portions 112a,b to the dynamic overlay utility 142.

The dynamic overlay utility 142 combines the face portions 112a,b with the remaining portions 114 of the AV recording 106. For example, the dynamic overlay utility 142 may, for each frame of the AV recording 106, identify a region of the remaining portions 114 that corresponds to the missing face of a person (e.g., based on information or instructions from the face identifier 138). The identified region may be encoded by a mask identifier 122a,b and/or the public key 128. For example, the dynamic overlay utility 142 may use a first mask identifier 122a associated with (e.g., encoded within) one region for which the remaining portions 114 lack image information to determine that a first face portion 112a that is associated with the same mask identifier 122a should be overlayed in this region. The dynamic overlay utility 142 may display the frame of the remaining portions 114 and overlay (e.g., simultaneously display) the face portions 112a,b for the identified region(s) with missing faces.

The media player device 132 then displays the video presentation 144 (e.g., on a monitor or display of the media player device 132) that includes the combined face portions 112a,b and the remaining portions 114 of the AV recording 106, such that the video presentation 144 recreates the AV recording 106, while the entire AV recording 106 is not available for download from the media server 130. As such, the media player device 132 facilitates the dynamic combination of protected face portions 112a,b with remaining portions 114 from the media stream 133 and the display of the securely reconstructed video presentation 144. This practical application into which the media player device 132 can be integrated uniquely allows the reliable and efficient display of a video presentation 144 (e.g., which is visually identical or similar to the AV recording 106) without allowing the AV recording 106 to be obtained (e.g., downloaded from media server 130) by a bad actor wishing to create synthetic media.

In an example operation of the media hosting and storage system 102 of FIG. 1, an AV recording 106 is received by the media hosting and storage system 102. The AV recording 106 of this example includes a first person speaking and a second person speaking (e.g., the first person 204a and second person 204b of FIG. 2). The face detector 108 detects in various image frames of the AV recording 106 faces of the first and second person. Any method or algorithm of face detection may be employed for face detection. In some embodiments, the media hosting and storage system 102 identifies portions or regions of frames of the AV recording 106 that correspond to a face presented in the AV recording 106. In some cases, the media hosting and storage system 102 may particularly detect faces of persons of interest, as described in greater detail above.

The image region extractor 110 removes regions (e.g., regions 202a,b of FIG. 2) of the AV recording 106 (e.g., image or pixel regions of each image frame) that correspond to locations of the detected faces (e.g., faces 206a,b of FIG. 2). These removed regions are provided as first face portions 112a for the first person and second face portions 112b for the second person. The remaining portions 114 of the AV recording 106 include regions of the frames of the AV recording 106 that are not removed as face portions 112a,b. As such, the first face portions 112a include regions of the frames of the AV recording 106 that include the face of the first person, and the second face portions 112b include regions of the frames of the AV recording 106 that include the face of the second person. A first mask identifier 122a is generated to associate the first face portions 112a with the face of the first person (e.g., face 206a of person 204a of FIG. 2), and the second mask identifier 122b is generated to associate the second face portions 112b with the second face of the second person (e.g., face 206b of person 204b of FIG. 2), such that the face portions 112a,b can be placed in the appropriate empty regions (e.g., regions 202a,b of FIG. 2) of the remaining portions 114 to recreate a presentation 144 of the AV recording 106, as described further below.

The face portions 112a,b are provided to the face data storage utility 116, which stores the face portions 112a,b in an encrypted form in the secure database 118. A private key 120 and public key 128 are generated for the decryption of the encrypted face portions 112a,b. The encrypted face portions 112a,b are stored in the secure database and linked or associated with the private key 120 and mask identifiers 122a,b, as illustrated in FIG. 1. For example, the first face portions 112a may be associated with the first mask identifier 122a and the private key 120, and the second face portions 112b may be associated with the second mask identifier 122b and the private key 120.

Meanwhile, the public key affixing utility 126 associates or links the remaining portions 114 of the AV recording 106 with the public key 128 and the mask identifiers 122a,b. Referring to both FIGS. 1 and 2, the public key affixing utility 126 may encode regions 202a,b of the remaining portions 114 that are missing faces 206a,b with the mask identifier 122a,b for the person 204a,b whose face 206a,b was removed and the public key 128 needed to decrypt the face portions 112a,b. For example, a region 202a of the remaining portions 114 that is missing the first face portions 112a may be encoded with the public key 128 and the first mask identifier 122a, and a region 202b of the remaining portions 114 that is missing the second face portions 112b may be encoded with the public key 128 and the second mask identifier 122b. The remaining portions 114 with the mask identifier 122a,b and public key 128 are provided to the media server 130, such that this information can be streamed to a media player, such as the media player device 132 of FIG. 1 at a later time.

In an example operation of the media player device 132 of FIG. 1, the media player device 132 receives the remaining portions 114, public key 128, and mask identifiers 122a,b described in the example above. The combination of the remaining portions 114, public key 128, and mask identifiers 122a,b may be sent as a media stream 133 from the media server 130. The AV sink 134 stores the media stream in a memory of the device 132 (e.g., in the memory 504 of FIG. 5).

The AV sink 134 provides the remaining portions 114, public key 128, and mask identifiers 122a,b to the frame buffer 136. The frame buffer 136 extracts the mask identifiers 122a,b and the public key 128 and provides these to the face identifier 138. The frame buffer 136 provides the remaining portions to the dynamic overlay utility 142 for generating the video presentation 144. In some embodiments, the frame buffer 136 temporarily stores, in a memory of the media player device 132, the remaining portions 114 of the AV recording 106 at least until the face portions 112a,b are received. In such embodiments, only after the remaining portions 114 and face portions 112a,b are combined to create the presentation 144, are the stored remaining portions 114 allowed to be removed from the memory of the media player device 132.

The face identifier 138 provides the extracted mask identifiers 122a,b and public key 128 to the secured face frame connector 140. The secured face frame connector 140 communicates with the media hosting and storage system 102 to obtain the protected face portions 112a,b that are needed to reconstruct the original AV recording 106. The secured face frame connector 140 may provide authentication credentials 148 for accessing the media hosting and storage system 102. The credentials 148 may include, for example, a password, username, and/or any information used by the media hosting and storage system 102 to authenticate access to information in the secure database 118 by the media player device 132. The secured face frame connector 140 provides a request 146 for the protected face portions 112a,b of the AV recording 106 to the media hosting and storage system 102. The request includes the public key 128 and mask identifiers 122a,b.

Returning briefly to example operation of the media hosting and storage system 102, the media hosting and storage system 102 receives the request 146 for the face portions 112a,b of the AV recording 106. As described above, the request includes the public key 128 and the mask identifiers 122a,b. The media hosting and storage system 102 may use the mask identifiers 122a,b to identify and provide the appropriate face portions 112a,b to the media player device 132. For example, the media storage and hosting system 102 may determine that the received first mask identifier 122a corresponds to the stored first face portion 112a for the first person presented in the AV recording 106. The media hosting and storage system 102 may determine that the received public key 128 corresponds to the private key 120 of the stored first face portion 112a,b. In response, the media hosting and storage system 102 may authorize providing the first face portion 112a of the AV recording 106 to the media player 132. Similarly, the media hosting and storage system 102 may authorize providing the second face portion 112b after determining that the received second mask identifier 122b corresponds to the stored second face portion 112b and that the public key 128 corresponds to the stored private key 120. The face portions 112a,b may then be decrypted using the private key 120 and public key 128 according to any appropriate decryption method. The system may embed a watermark in the first face portion 112a and/or the second face portion 112b (e.g., to aid in preventing use of the face portions 112a,b for creating synthetic media and/or labeling the face portions 112a,b that are provided to the media player device 132). The decrypted and/or watermarked face portions 112a,b are provided to the media player device 132.

Returning to the example operation of the media player device 132, the secured face frame connector 140 receives the face portions 112a,b from the media hosting and storage system 102. After receiving the face portions 112a,b, the secured face frame connector 140 provides the face portions 112ab to the face identifier 138, which provides the face portions 112a,b to the dynamic overlay utility 142. The dynamic overlay utility 142 combines the face portions 112ab and the remaining portions 114 of the AV recording 106. As described above with respect to FIG. 2, the face portions 112ab and the remaining portions 114 may be combined by identifying regions 202a,b of each frame 200 of the remaining portions 114 of the AV recording 106 in which a face portion 112a,b should be inserted/overlayed. For example, the dynamic overlay utility 142 (and/or the face identifier 138) may identify, in each frame 200, regions 202a,b corresponding to missing face portions 112a,b in the remaining portions 114 of the AV recording 106 (e.g., using the encoded mask identifiers 122a,b and/or public key 128). The dynamic overlay utility 142 then displays the remaining portion 114 of the AV recording 106 and overlays the face portions 112a,b into the identified regions 202a,b corresponding to the missing face portions 112a,b. Thus, the video presentation 144 is able to be displayed without allowing access (e.g., via download from media server 130) to the original AV recording 106, which may be used for synthetic media creation.

Example Storage and Hosting of Protected Videos

Figure 3:
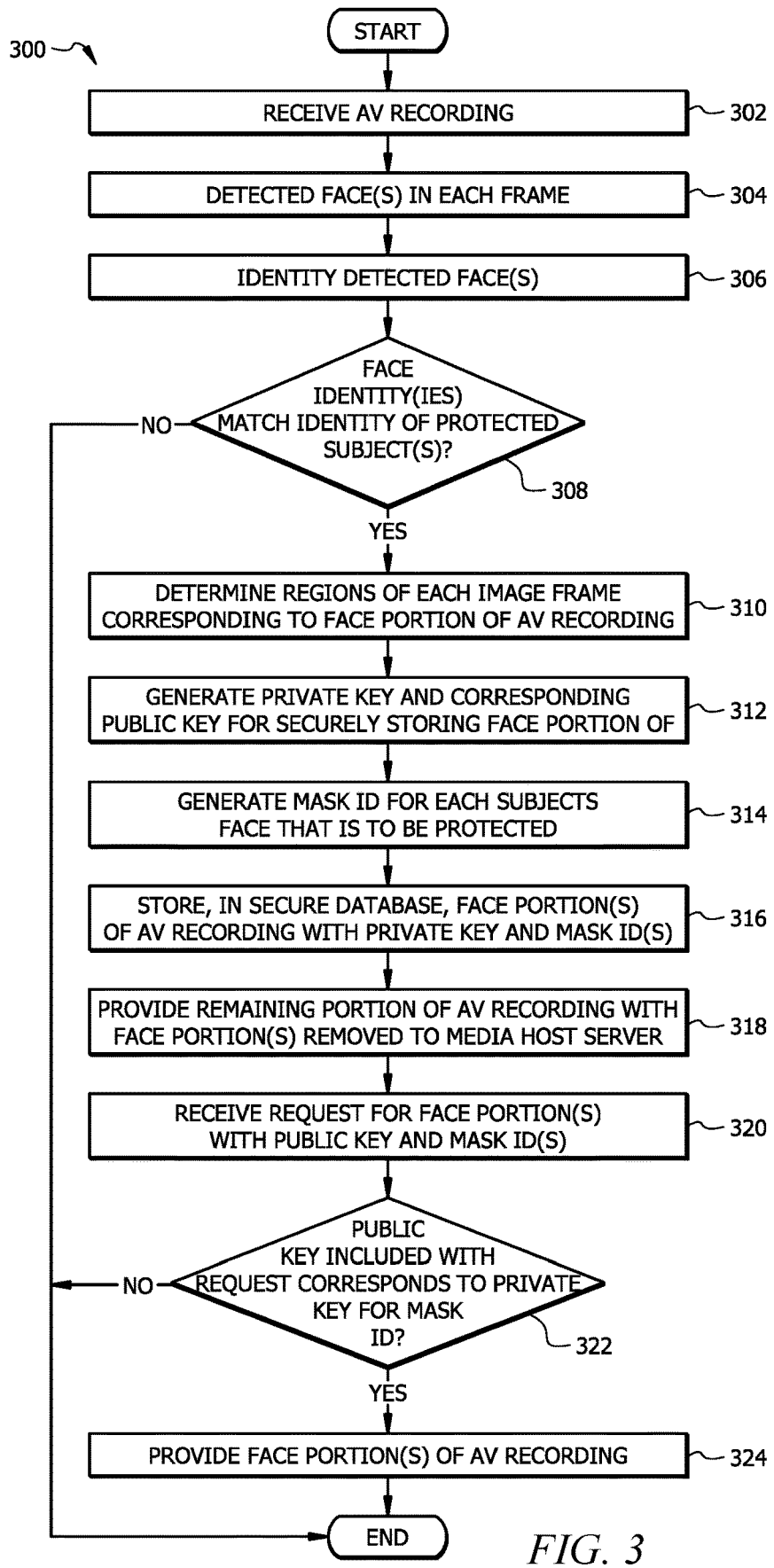
FIG. 3 is a flow diagram illustrating the secure storage and hosting of media using components of the system of FIG. 1

FIG. 3 is a flowchart of an example method 300 for operating the system 100 of FIG. 1. The method 300 generally facilitates the secure storage of face portions 112a,b of AV recordings 106, such that synthetic media cannot be created from the AV recording 106. Method 300 may be performed using the media hosting and storage system 102 of FIG. 1. Method 300 may begin at step 302 where the media hosting and storage system 102 receives an AV recording 106.

At step 304, the media hosting and storage system 102 detects faces in frames of the AV recording 106 (e.g., in each frame, such as example frame 200 of FIG. 2, that presents a face of a person). At step 306, the media hosting and storage system 102 may determine identities associated with the detected faces. For example, the media hosting and storage system 102 may determine a name of an individual associated with a detected face from step 304. For example, the face detector 108 of FIG. 1 may execute instructions (e.g., the face detection instructions 508 of FIG. 5) which include a record of faces of interest (e.g., record 514 of FIG. 5) corresponding to subjects for whom the creation of synthetic media should be prevented and match detected faces from step 304 to faces from this record.

At step 308, the media hosting and storage system 102 determines whether the identities determined at step 306 correspond to the identities of individuals for whom synthetic media creation should be prevented. For example, if the identities were able to be determined at step 306, the media hosting and storage system 102 may determine that the person(s) should be protected against synthetic media creation. As another example, if identities determined at step 306 are one of a set of predetermined identities of persons of interest (e.g., included in a record 514 of the face detection instructions 508 of FIG. 5), then the persons may be protected against synthetic media creation using steps 310-324. In some embodiments, unidentified faces are not protected via removal and secure storage as a face portions 112a,b. If none of the identities correspond to persons for whom synthetic media creation should be prevented, the method 300 ends. Otherwise, the media hosting and storage system 102 proceeds to step 310.

At step 310, the media hosting and storage system 102 determines regions 202a,b of faces of known subjects (e.g., individuals) identified at step 308 for whom the media hosting and storage system 102 protects against the creation of synthetic media. The regions 202a,b may be determined by the image region extractor 110 of FIG. 1. Referring to the example of FIG. 2, face portions 112a,b may be extracted for regions 202a,b of the AV recording 106 corresponding to the face of two known subjects identified at step 308 presented in the AV recording 106.

At step 312, the media hosting and storage system 102 generates a private key 120 and public key 128 for decrypting the face portions 112a,b after the face portions 112a,b are stored in an encrypted form. Any cryptographic method or algorithm may be used to generate the private key 120 and public key 128. At step 314, the media hosting and storage system 102 generates a mask identifier 122a,b for each of the subject's faces detected and identified at steps 306 and 308, as described above with respect to FIGS. 1 and 2.

At step 316, the media hosting and storage system 102 stores the face portions 112a,b in a secure (e.g., encrypted) form in the secure database 118. In some embodiments, the face portions 112a,b are encrypted for secure storage. The face portions 112a,b may be encrypted during the generation of the private key 120 and public ley 128 (e.g., such that steps 312 and 316 are combined).

At step 318, the media hosting and storage system 102 provides the remaining portions 114 of the AV recording to the media server 130 for streaming as media stream 133. In some embodiments, the region(s) 202a,b from which the face portions 112a,b are removed are encoded with the mask identifiers 122a,b and public key 128 (see FIG. 2).

At step 320, the media hosting and storage system 102 receives a request 146 for the protected face portions 112a,b of the AV recording 106. The request 146 includes the public key 128 and the mask identifiers 122a,b. The media hosting and storage system 102 may also receive authentication credentials 148 and determine if the credentials 148 are authenticated prior to receiving request 146 and/or providing requested face portions 112a,b in response to the request 146.

At step 322, the media hosting and storage system 102 determines if the public key 128 and mask identifiers 122a,b included in the request 146 correspond to the private key 120 and mask identifiers 122a,b of the stored face portions 112a,b. For example, the system may identify the face portions 112a,b corresponding to the received mask identifiers 122a,b. If the public key 128 is the appropriate key for decrypting the stored face portions 112a,b in combination with the private key 120, the media hosting and storage system 102 may determine that the public key 128 and mask identifiers 122a,b of the request 146 correspond to the private key 120 and mask identifiers 122a,b of the stored face portions 112a,b and the proceed to step 324. If the public key 128 cannot be used to decrypt the face portions 112a,b, then the method 300 may end. If there are no face portions 112a,b stored with mask identifiers 122a,b that match the mask identifiers 122a,b of the request 146, the method 300 may end.

At step 324, the system 324 provides the face portions 112a,b. For example, the securely stored face portions 112a,b from database 118 may be decrypted, using the public key 128 and private key 120, and provided to the media player device 132, as illustrated in FIG. 1. The method 300 helps to prevent bad actors from obtaining the full or entire AV recording 106 in a form that would be usable for synthetic media creation (e.g., by preventing the download of the entire AV recording 106 from the media server 130 of FIG. 1). The specially selected remaining portions 114 of the AV recording 106 that can be obtained from the media server 130 generally cannot be used to create synthetic media.

Example Display of Videos From a Secure Video Source

Figure 4:
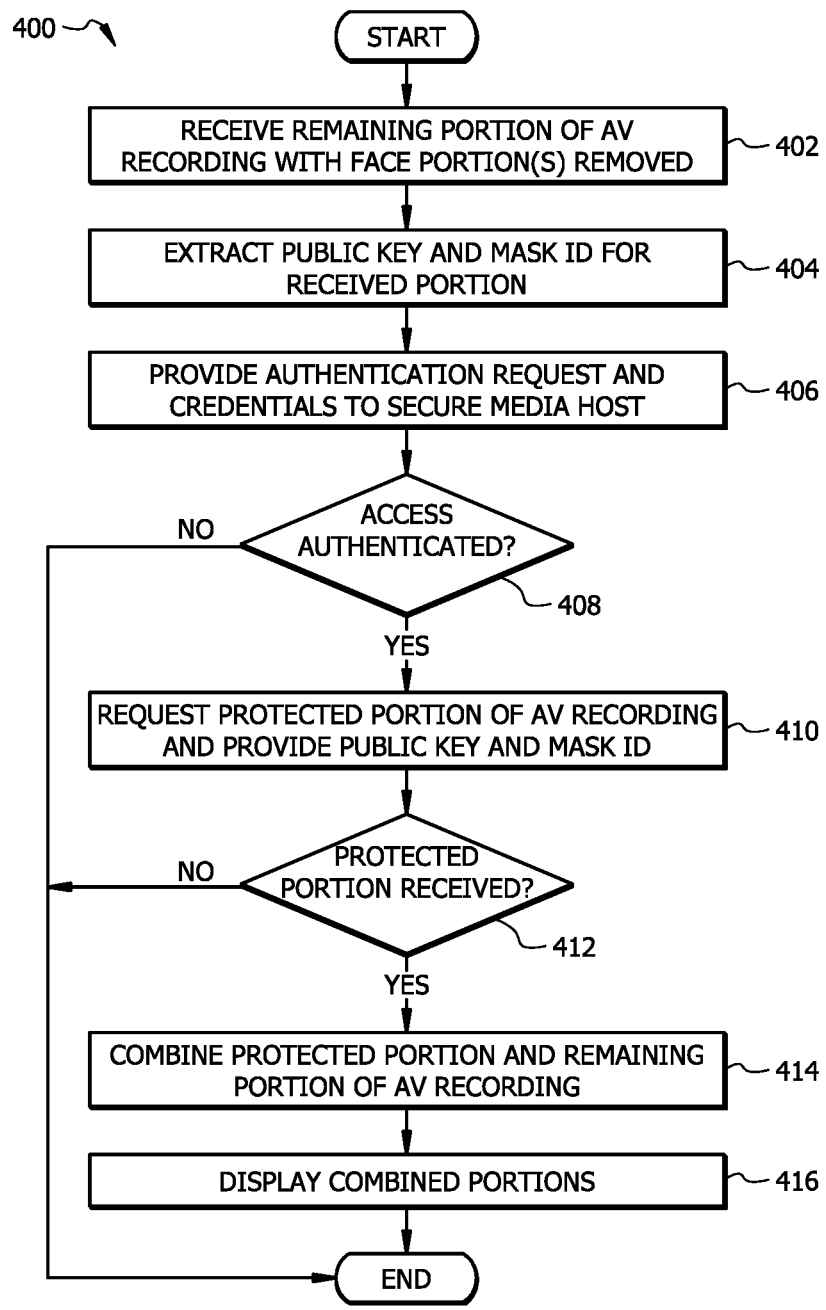
FIG. 4 is a flow diagram illustrating an example operation of the media player device of the system of FIG. 1.

FIG. 4 is a flowchart of an example method 400 for operating the system 100 of FIG. 1. The method 400 generally facilitates the display of a video presentation 144 where at least a portion of the video data is received from a secure source, such as the media hosting and storage system 102 of FIG. 1. Method 400 may be performed using the media player device 132 of FIG. 1. Method 400 may begin at step 402 where a media stream 133 is received that includes remaining portions 114 of an AV recording 106 with face portions 112a,b removed. The media stream 133 also includes a public key 128 and mask identifiers 122a,b for each face portion 112a,b not included in (e.g., missing from) the remaining portions 114 (see example frame 200 of the remaining portions 114 shown in FIG. 2).

At step 404, the media player device 132 extracts the public key 128 and mask identifiers 122a,b from the media stream 133 (e.g., using the frame buffer 138 of FIG. 1 as described above). At step 406, the media player device 132 may provide authentication credentials 148 to the secure video source (e.g., to the media hosting and storage system 102 of FIG. 1). The credentials 148 may be used by the secure video source to verify that the media player device 132 should be granted access to the securely stored missing face portions 112a,b needed to generate video presentation 144. At step 408, the media player device 132 may determine whether access was authenticated by the secure video source. If access was not authenticated, the method 400 may end. Otherwise, if access is authenticated, the media player device 132 proceeds to step 410.

At step 410, the media player device 132 provides a request 146 for the securely stored face portions 112a,b that are missing from the remaining portions 114 received at step 402. The request 146 includes the public key 128, which can be used to decrypt the securely stored face portions 112a,b, and the mask identifiers 122a,b, which can be used to identify the appropriate face portions 112a,b for generating the video presentation 144. At step 412, the media player device 132 determines if the requested face portions 112a,b are received. If the face portions 112a,b are not received, the method 400 ends. Otherwise, if the face portions 112a,b are received, the media player device 132 proceeds to step 414.

At step 414, the media player device 132 combines the received face portions 112a,b with the remaining portions 114, as described above with respect to FIGS. 1 and 2 (e.g., using the dynamic overlay utility 142 of the media player device 132). At step 416, the combined video portions 112a,b and 114 are displayed as video presentation 144. As such, method 400 facilitates the dynamic combination of the protected face portions 112a,b with the remaining portions 114 from a media stream 133 and the display of a securely reconstructed video presentation 144. Method 400 may be implemented using the media player device 132 of FIG. 1, which facilitates the reliable and efficient presentation of media (e.g., the AV recording 106) without allowing the underlying AV recording 106 to be obtained (e.g., downloaded from the media server 130) by a bad actor wishing to create synthetic media.

Example Device

Figure 5:
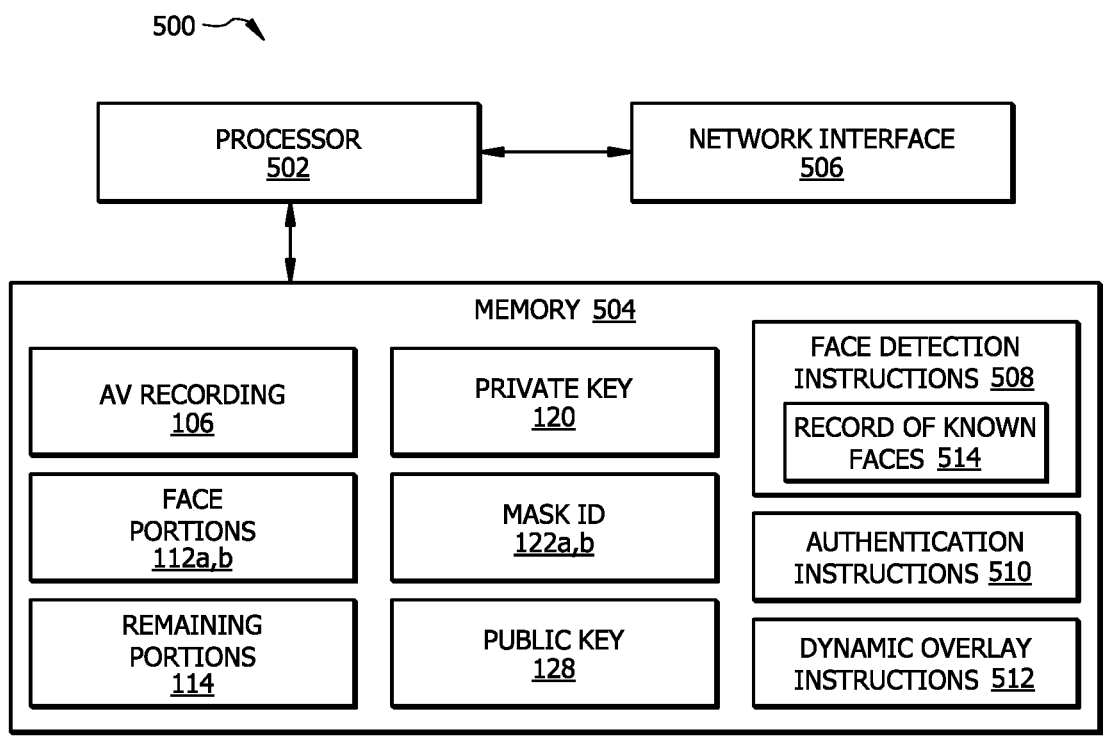
FIG. 5 is a diagram of an example device configured to implement components of the system of FIG. 1.

FIG. 5 is an embodiment of a device 500 configured to implement various components of the system 100. The device 500 includes a processor 502, a memory 504, and a network interface 506. The device 500 may be configured as shown or in any other suitable configuration. The device 500 may be and/or may be used to implement the media hosting and storage system 102, including the various components 104, 108, 110, 116, 118, 124, 126 of system 102, the media server 130, and the media player device 132, including the various components 134, 136, 138, 140, 142 of the device 132 of FIG. 1.

The processor 502 comprises one or more processors operably coupled to the memory 504. The processor 502 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 504 and the network interface 506. The one or more processors are configured to process data and may be implemented in hardware or software. For example, the processor 502 may be 8-bit, 16-bit, 32-bit, 64-bit or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to method 300 and 400 of FIGS. 3 and 4. In an embodiment, the function described herein is implemented using logic units, FPGAs, ASICs, DSPs, or any other suitable hardware or electronic circuitry.

The memory 504 is operable to store AV recording(s) 106, face portions 112a,b, remaining portions 114, private key 120, mask identifiers 122a,b, public key 128, face detection instructions 508, authentication instructions 510, dynamic overlay instructions 512, and any other data, instructions, logic, rules, or code operable to execute the function described herein. The face detection instructions 508 include any data, logic, rules, or code (e.g., for executing a machine learning or artificial intelligence algorithm) for the detection of faces, including faces of subjects of interest, which may be used, for example, by the face detector 108 of FIG. 1 to detect faces of persons presented in an AV recording 106. The face detection instructions 508 may include a record 514 of faces of known individuals (e.g., persons of interest). The authentication instructions 510 include any data, logic, rules, or code for determining whether access to the media hosting and storage system 102 should be granted based on a received credential 148 (see FIG. 1). The dynamic overlay instructions 512 include any data, logic, rules, or code for combining face portions 12a,b and remaining portions 114 of an AV recording 106 in order to display a video presentation 144 (see FIG. 1). The memory 504 comprises one or more disks, tape drives, or solid-state drives, and may be used as an over-flow data storage device, to store programs when such programs are selected for execution, and to store instructions and data that are read during program execution. The memory 504 may be volatile or non-volatile and may comprise read-only memory (ROM), random-access memory (RAM), ternary content-addressable memory (TCAM), dynamic random-access memory (DRAM), and static random-access memory (SRAM).

The network interface 506 is configured to enable wired and/or wireless communications. The network interface 506 is configured to communicate data between the device 500 and other network devices, systems, or domain(s). For example, the network interface 506 may comprise a WIFI interface, a local area network (LAN) interface, a wide area network (WAN) interface, a modem, a switch, or a router. The processor 502 is configured to send and receive data using the network interface 506. The network interface 506 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
 a media server configured to provide a media stream comprising a first portion of an audio-video recording, a public key corresponding to the audio-video recording, and a mask identifier associated with a subject presented in the audio-video recording;

a secure media hosting system configured to store:
a protected portion of the audio-video recording, wherein the protected portion of the audio-video recording is missing from the media stream;
a private key associated with the audio-video recording; and
the mask identifier; and a media player communicatively coupled to the media server and the secure media hosting system, the media player comprising a processor configured to:
receive the media stream;
extract the public key and the mask identifier from the media stream;
provide a request for the protected portion of the audio-video recording to the secure media hosting system, wherein the request comprises the extracted public key and the mask identifier;
following providing the request for the protected portion of the audio-video recording, receive the protected portion of the audio-video recording from the secure media hosting system, in response to determining that the extracted public key corresponds to the private key;
combine the first portion and the protected portion of the audio-video recording; and
display the combined first portion and the protected portion of the audio-video recording.

2. The system of claim 1, wherein the protected portion of the audio-video recording comprises a face of the subject presented in the audio-video recording.

3. The system of claim 2, wherein the first portion of the audio-video recording comprises remaining portions of the audio recording with the protected portion removed, such that, when combined, the first portion and the protected portion of the audio video recording comprise the entire audio-video recording.

4. The system of claim 1, wherein the media player further comprises a memory configured to:
temporarily store the received first portion of the audio-video recording at least until the protected portion of the audio-video recording is received; and
after the combined first portion and the protected portion of the audio-video recording are displayed, allow the stored first portion of the audio-video recording to be removed from the memory of the media player.

5. The system of claim 1, wherein the processor is further configured to combine the first portion and the protected portion of the audio-video recording by, for each frame of the audio-video recording:
identifying, in the frame, a region corresponding to a missing face portion in the first portion of the audio-video recording;
displaying the first portion of the audio-video recording; and
overlaying the received protected portion of the audio-video recording, for the frame, into the identified region corresponding to the missing face.

6. The system of claim 5, wherein the region corresponding to the missing face portion is encoded with the public key and the mask identifier.

7. The system of claim 1, wherein the processor is further configured to, prior to receiving the protected portion of the audio-video recording, provide authentication credentials for accessing the secure media hosting system.

8. A method comprising, by a processor of a media player device:
receiving a media stream comprising a first portion of an audio-video recording, a public key corresponding to the audio-video recording, and a mask identifier associated with a subject presented in the audio-video recording, wherein the first portion of the audio-video recording comprises the audio-video recording with a protected portion removed, wherein the protected portion of the audio-video recording is associated with a private key and the mask identifier, and wherein the protected portion of the audio-video recording is missing from the media stream;
extracting the public key and the mask identifier from the media stream;
providing a request for the protected portion of the audio-video recording, wherein the request comprises the extracted public key and the mask identifier;
following providing the request for the protected portion of the audio-video recording, receiving the protected portion of the audio-video recording, in response to determining that the extracted public key corresponds to the private key;
combining the first portion and the protected portion of the audio-video recording; and
displaying the combined first portion and the protected portion of the audio-video recording.

9. The method of claim 8, wherein the protected portion of the audio-video recording comprises a face of the subject presented in the audio-video recording.

10. The method of claim 8, wherein the first portion of the audio-video recording comprises remaining portions of the audio recording with the protected portion removed, such that, when combined, the first portion and the protected portion of the audio video recording comprise the entire audio-video recording.

11. The method of claim 8, further comprising:
temporarily storing, in a memory of the media player, the received first portion of the audio-video recording at least until the protected portion of the audio-video recording is received; and
after displaying the combined first portion and the protected portion of the audio-video recording, allowing the stored first portion of the audio-video recording to be removed from the memory of the media player.

12. The method of claim 8, further comprising combining the first portion and the protected portion of the audio-video recording by, for each frame of the audio-video recording:
identifying, in the frame, a region corresponding to a missing face portion in the first portion of the audio-video recording;
displaying the first portion of the audio-video recording; and
overlaying the received protected portion of the audio-video recording, for the frame, into the identified region corresponding to the missing face.

13. The method of claim 12, wherein the region corresponding to the missing face portion is encoded with the public key and the mask identifier.

14. The method of claim 8, further comprising, prior to receiving the protected portion of the audio-video recording, providing authentication credentials for accessing the secure media hosting system.

15. A media player device, comprising:
a network interface configured to communicate with:
a media server configured to provide a media stream comprising a first portion of an audio-video recording, a public key corresponding to the audio-video recording, and a mask identifier associated with a subject presented in the audio-video recording; and a secure media hosting system configured to store:
- a protected portion of the audio-video recording, wherein the protected portion of the audio-video recording is missing from the media stream;
- a private key associated with the audio-video recording; and
- the mask identifier; and a processor communicatively coupled to the network interface, the processor configured to:
- receive the media stream;
- extract the public key and the mask identifier from the media stream;
- provide a request for the protected portion of the audio-video recording to the secure media hosting system, wherein the request comprises the extracted public key and the mask identifier;
- following providing the request for the protected portion of the audio-video recording, receive the protected portion of the audio-video recording from the secure media hosting system, in response to determining that the extracted public key corresponds to the private key;
- combine the first portion and the protected portion of the audio-video recording; and
- display the combined first portion and the protected portion of the audio-video recording.

16. The media player device of claim 15, wherein the protected portion of the audio-video recording comprises a face of the subject presented in the audio-video recording.

17. The media player device of claim 16, wherein the first portion of the audio-video recording comprises remaining portions of the audio recording with the protected portion removed, such that, when combined, the first portion and the protected portion of the audio video recording comprise the entire audio-video recording.

18. The media player device of claim 15, wherein the media player device further comprises a memory configured to:
- temporarily store the received first portion of the audio-video recording at least until the protected portion of the audio-video recording is received; and
- after the combined first portion and the protected portion of the audio-video recording are displayed, allow the stored first portion of the audio-video recording to be removed from the memory of the media player device.

19. The media player device of claim 15, wherein the processor is further configured to combine the first portion and the protected portion of the audio-video recording by, for each frame of the audio-video recording:
- identifying, in the frame, a region corresponding to a missing face portion in the first portion of the audio-video recording, wherein the region corresponding to the missing face portion is encoded with the public key and the mask identifier;
- displaying the first portion of the audio-video recording; and
- overlaying the received protected portion of the audio-video recording, for the frame, into the identified region corresponding to the missing face.

20. The media player device of claim 15, wherein the processor is further configured to, prior to receiving the protected portion of the audio-video recording, provide authentication credentials for accessing the secure media hosting system.

* * * * *